(12) United States Patent
Kojima

(10) Patent No.: US 8,516,682 B2
(45) Date of Patent: Aug. 27, 2013

(54) MANUFACTURING METHOD OF A STATOR CORE OF ROTATING ELECTRICAL MACHINE

(75) Inventor: Ryoutarou Kojima, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/408,424

(22) Filed: Feb. 29, 2012

(65) Prior Publication Data

US 2012/0223609 A1 Sep. 6, 2012

(30) Foreign Application Priority Data

Mar. 1, 2011 (JP) ................................. 2011-044371

(51) Int. Cl.
*H02K 15/00* (2006.01)

(52) U.S. Cl.
USPC .................................. 29/596; 29/598; 29/609

(58) Field of Classification Search
USPC ......................... 29/596–598, 732–736, 564.1; 310/216.041–217, 260, 156.53, 211, 71, 310/87
See application file for complete search history.

(56) References Cited

U.S. PATENT DOCUMENTS

| 4,339,873 | A  | * | 7/1982  | Kanamaru et al. | 29/598 |
| 6,718,616 | B2 | * | 4/2004  | Fukui et al.    | 29/596 |
| 6,822,358 | B2 | * | 11/2004 | Nozaki et al.   | 310/90 |
| 7,140,090 | B2 | * | 11/2006 | Williams et al. | 29/596 |
| 7,260,880 | B2 | * | 8/2007  | Harada et al.   | 29/596 |
| 8,286,331 | B2 | * | 10/2012 | Hashimoto       | 29/596 |
| 2008/0179986 | A1 |   | 7/2008  | Harada et al.   |        |
| 2012/0223609 | A1 | * | 9/2012  | Kojima          | 310/216.041 |

FOREIGN PATENT DOCUMENTS

| JP | A-S62-290335 | 12/1987 |
| JP | A-11-155263  | 6/1999  |
| JP | A-2001-112197 | 4/2001 |
| JP | A-2006-246586 | 9/2006 |
| JP | A-2007-135314 | 5/2007 |
| JP | A-2008-182864 | 8/2008 |
| JP | A-2010-193715 | 9/2010 |

OTHER PUBLICATIONS

Nov. 14, 2012 Office Action issued in Patent Application No. 2011-044371 (with English translation).

* cited by examiner

*Primary Examiner* — Minh Trinh

(74) *Attorney, Agent, or Firm* — Oliff & Berridge, PLC

(57) ABSTRACT

A manufacturing method of a stator core of a rotating electrical machine includes a finishing process that simultaneously moves a coining punch divided in a circumferential direction and arranged around a helically stacked core to a center side in a radial direction and presses an outer surface of a core-back part of the helically stacked core while pressing an end side of the helically stacked core in an axial direction by a holding device.

3 Claims, 5 Drawing Sheets

FLOW CHART OF A MANUFACTURING PROCESS

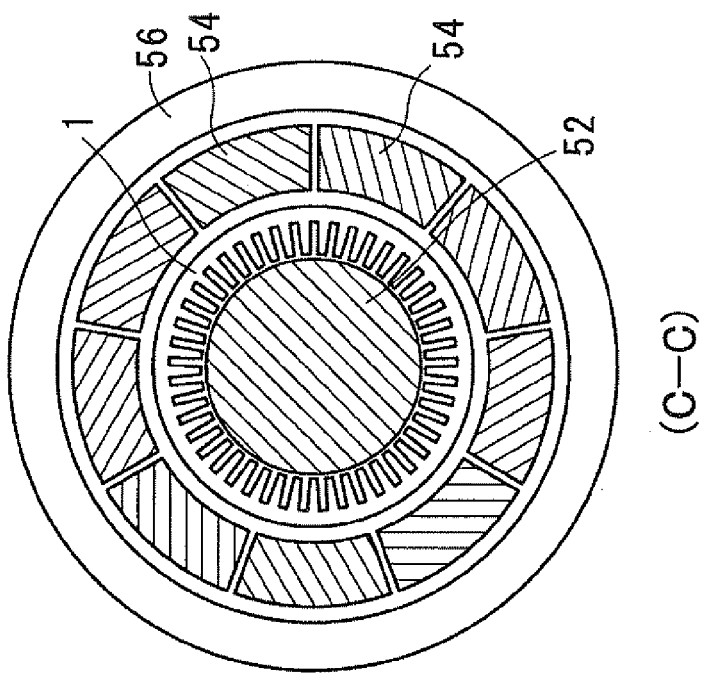
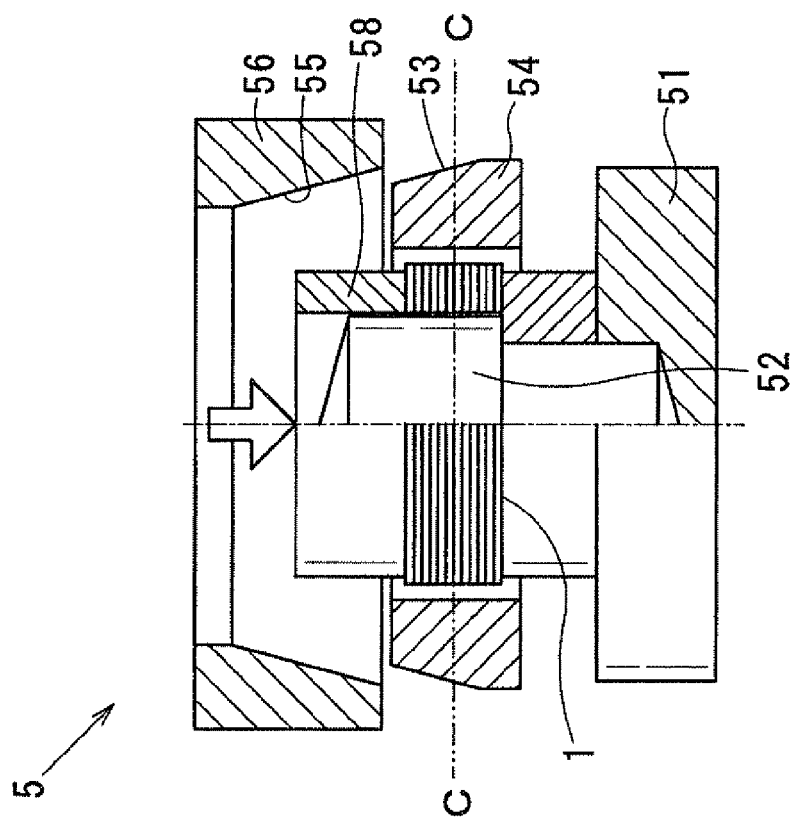

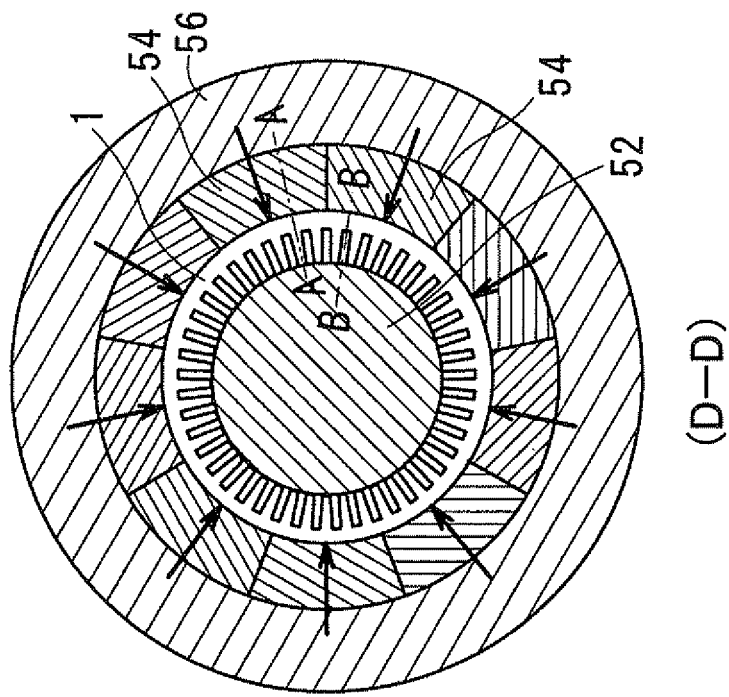
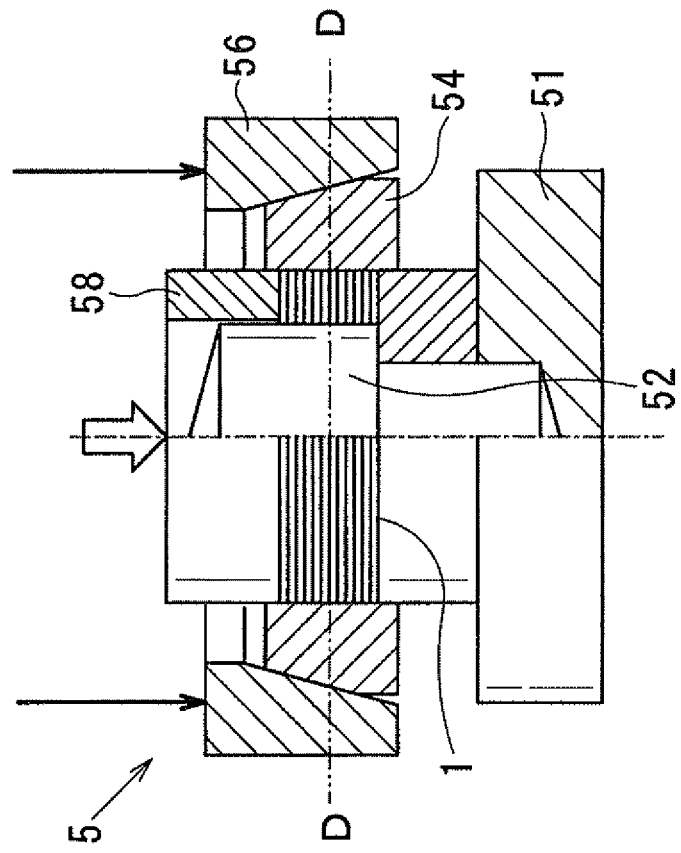
FIG. 4A
FIG. 4B

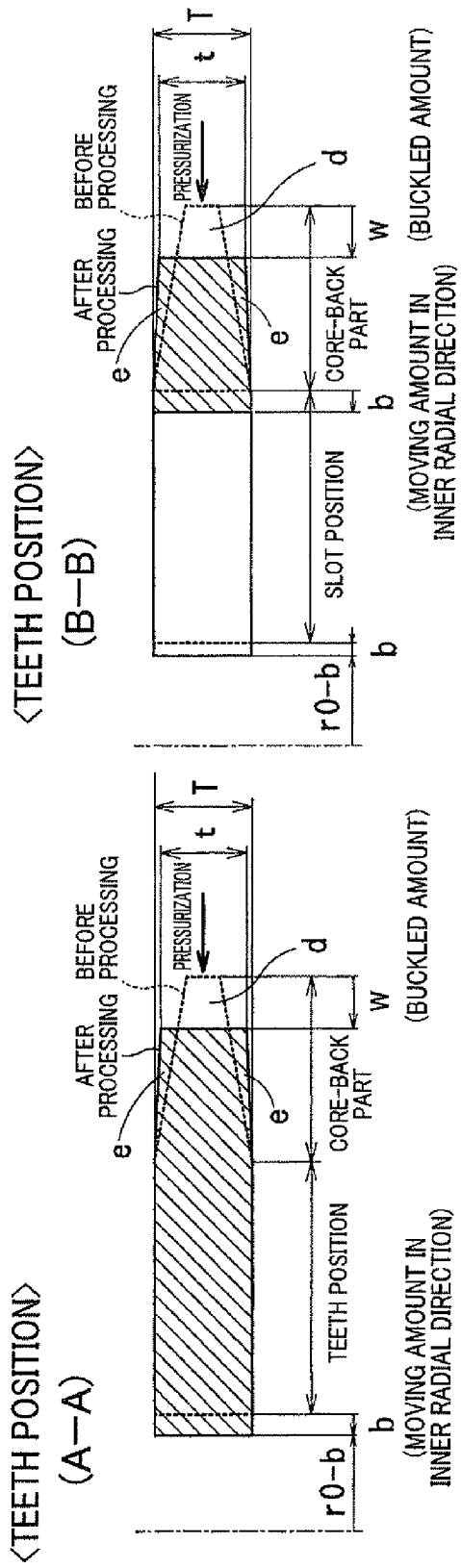

MANUFACTURING METHOD OF A STATOR CORE OF ROTATING ELECTRICAL MACHINE

CROSS-REFERENCE TO RELATED APPLICATION

This application is based on and claims the benefit of priority from earlier Japanese Patent Application No 2011-44371 filed Mar. 1, 2011, the description of which is incorporated herein by reference.

TECHNICAL FIELD

The present disclosure relates to a method of manufacturing a stator core of a rotating electrical machine that has an improved finishing process which corrects the form of a helically stacked core, and a stator core manufactured by the method mentioned above.

BACKGROUND

As a stator core of a rotating electrical machine such as an AC generator for vehicles, a helical fixed iron core (helically stacked core) is used.

The helically stacked core (hereinafter, simplified to helical core) is constituted by punching one side in a width direction of a strip of steel sheet in a rectangular shape at a fixed interval to form a core sheet with a plurality of slots and teeth, winding the slotted core sheet spirally so that the core sheet is stacked, and joining between the stacked core sheets.

When winding the helical core spirally and stacking it into the cylindrical (toric) shape, another side of the core sheet is rolled.

For this reason, the core sheet stacked spirally has the side (core-back part) whose thickness is thinner than the side where the slots and teeth are formed.

As a result, gaps are produced between the stacked core sheets on an outer circumferential side (core-back part) of the cylindrical helical core.

Moreover, when forming the cylindrical helical core by rolling the core-back part of the core sheet, some misalignment occurs in an outer circumference and an inner circumference of the helical core between each layer, and dispersion in a radius from a central axis occurs.

For this reason, a finishing process that reforms the misalignment and corrects the inner and outer circumferential surfaces to predetermined sizes is needed as a following process to the above-mentioned winding process.

A conventional manufacturing method of a helical core is explained with a flow chart shown in FIG. 2A.

A) Pressing process: forms a core sheet that has slots punched out on one side of a strip of steel sheet at a fixed interval to form teeth between the slots, and core-back parts on another side of the steel sheet.
B) Winding process: rolls a thickness direction of the core-back parts of the core sheet into a tapered shape by using such as a roller, and forms a stacked core by winding spirally and stacking cylindrically the core sheet so that the teeth are positioned in an inner diameter side of the stacked core.
C) Joining (welding) process: joins between each layer of the stacked core by welding etc.
D) Finishing process: consists of an ironing process that corrects inner and outer circumferential surfaces of the stacked core to a predetermined size and a deburring process that removes burr produced by the ironing process.
E) Cleaning process: removes oil etc. applied to processing parts for reducing friction of the ironing process during the finishing process.

As a conventional finishing process, Japanese Patent Application Laid-Open Publication No. 2006-246586 discloses a method of forming inner and outer circumferential surfaces and shapes of slots with high precision by ironing the inner and outer circumferential surfaces while pressing a stacked core.

Moreover, Japanese Patent Application Laid-Open Publication No.2007-135314 discloses a technology that corrects an outer circumferential side perpendicular to a plate surface by disposing a coining punch, which is divided in a plurality of pieces in a circumferential direction, on a perimeter of a stacked core, and coining by pressing the coining punch inside the radial direction.

Furthermore, Japanese Patent Application Laid-Open Publication No.2001-112197 discloses a problem that a stator core deforms when sandwiched by a frame if a gap exists between core sheets in an outer circumferential side of the cylindrically stacked core.

In the method of manufacturing the stator core disclosed in the publication '586, the outer circumferential surface of the stacked core sheet is sheared by moving an outer circumferential surface forming part in a stacking direction as it slides from the outer circumference of the stacked core while moving the stacked core sheet in an inner radial direction, then arrayed.

Thereby, the inner and outer circumferential surfaces can be corrected to predetermined sizes, however, the outer circumferential surface of the stacked core is easily turned over by frictional force and gaps between the core sheets expand partially, thus rain infiltrates inside the stacked core easily.

Moreover, a deburring process that removes burr produced by an ironing process, and a cleaning process that removes oil etc. applied for reducing friction of the ironing process are required, therefore a finishing process consumes man-hours.

On the other hand, an inner circumferential surface formation part for stators, a slot arrow, an end side holding member, etc. applied to the molding device disclosed in '586 are not adopted in a manufacturing method of a stator core disclosed in '314.

Therefore, problems arise easily such as an inner circumferential surface overrun that an inner diameter becomes smaller than a predetermined size, irregular slot sequence in which the slots lose shape, and floating teeth.

A problem arises in '197 that when a steel plate sheet is made thin in the stacked core for reducing iron loss, and the perimeter of the core-back part is thinned by rolling, a thickness in a stacking direction is compressed and a frame is distorted when bound tight with the frame.

SUMMARY

An embodiment provides a manufacturing method of a stator core of a rotating electrical machine that can correct properly by coining in a finishing process that corrects sizes of inner and outer diameters of a helically stacked core in predetermined sizes.

In a manufacturing method of a stator core of a rotating electrical machine according to a first aspect, the method includes a pressing process that forms a core sheet that has slots punched out on one side in a width direction of a strip of steel sheet at a fixed interval to form teeth between the slots, and core-back parts on another side of the steel sheet.

The method further includes a winding process that forms a helically stacked core by winding spirally and stacking cylindrically the core sheet so that the slots and teeth are positioned in an inner diameter side of the stacked core, a joining process that joins between each layer of the helically stacked core, and a finishing process that corrects inner and outer shapes to predetermined forms while correcting gaps of stacking of the helically stacked core.

The finishing process buckles the core-back part by a coining process that simultaneously moves a coining punch divided in a circumferential direction and arranged around the helically stacked core to a center side in a radial direction and presses an outer surface of each core-back part of the helically stacked core while pressing down an end side of the helically stacked core by a holding device, and In addition, both the core-back part and the teeth are deformed until an end side of an inner circumferential surface of the teeth becomes coaxial with the coining punch and contacts an inner circumferential surface pole arranged inside the helically stacked core so as to correct inner and outer circumferential surfaces of the helically stacked core.

In the finishing process, since the core-back part has less thickness than the plate because the other sides of the strip of steel is rolled, outer circumferential surfaces of each sheet are buckling-deformed and increase the plate thickness so that the gaps between core sheets are filled, and hence the gaps decrease substantially.

Moreover, since both the core-back part and the teeth are deformed until contacting the inner circumferential surface pole arranged inside the helically stacked core, the inner circumferential surfaces of the teeth becomes coaxial with the coining punch in a single process, thus the inner and outer diameters of the helical core can be corrected to a perfect circle and concentric.

By adopting the finishing process mentioned above, problems such as gaps generated between the stacked sheets, inner circumferential surface overrun, irregular slot sequence, and floating teeth can be prevented effectively, and problems like distortion of the frame at the time of binding tight with the frame can be solved.

In the manufacturing method of the stator core of the rotating electrical machine according to a second aspect, an amount of buckling deformation of each core-back part in a radial direction by the coining process is smaller at a slot position compared with a teeth position in a circumferential direction, and an amount of movement of each core-back part in the radial directional is larger at the slot position compared with the teeth position in the circumferential direction.

By setting the circumferential length before coining so that the whole core perimeter is reduced by simple bending into the inner circumference side instead of buckling deformation, the amount of buckling deformation is reduced in order to produce a simple bend in the inner circumferential direction of the core in a slot region on the circumference, the arc-shaped core-back part becomes more straight.

Thereby, pressing load by coining is reduced and processing energy is reduced.

That is because simple bending is more effective than buckling deformation when stress is small, and the reduction effect of the processing load produced by the bending is larger as the width of the core-back part is smaller.

Moreover, a radial pitch of a side in a back part of the slot can also be corrected to the inner circumferential side, thus eliminates the unnecessary gaps between a conductor, and can reduce a magnetic loss.

Even when applying the slot arrow of '314, the same action as the above may arise if gaps exist between the slot arrow and the inner circumference surface of the core-back part.

In addition, the simple bending action of the core-back part is considered as compressive modification of the whole core here.

In the manufacturing method of the stator core of the rotating electrical machine according to a third aspect, a plate thickness after the buckling near a perimeter of each core sheet of the helically stacked core after the coining process is thinner than a plate thickness of the core sheet.

This is to prevent rust generated by water infiltration from the gaps produced between each layers in the inner circumference side when the plate thickness after buckling deformation becomes thicker than the plate thickness of the portion where the plate is not buckling-deformed.

BRIEF DESCRIPTION OF THE DRAWINGS

In the accompanying drawings:

FIG. 3A shows a front sectional view of a device for a finishing process;

FIG. 3B shows a plane sectional view taken along a line C-C of FIG. 3A;

FIG. 4A shows a front sectional view of a device for a finishing process;

FIG. 4B shows a plane sectional view taken along a line D-D of FIG. 4A;

FIG. 5A shows plane sectional views taken along lines A-A and B-B of FIG. 1B; and FIG. 5B shows a table that explains the finishing process.

DETAILED DESCRIPTION OF THE PREFERRED EMBODIMENTS

With reference to the drawings, hereinafter will be described an embodiment of the present disclosure.

Figure 1A:
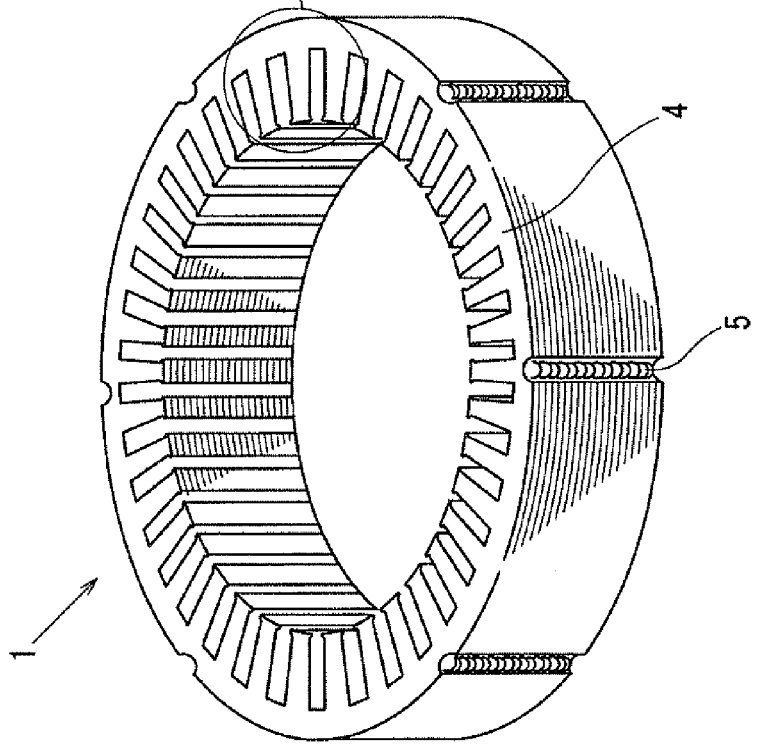
FIG. 1A shows a perspective view of a stator of a rotating electrical machine.
Figure 1B:
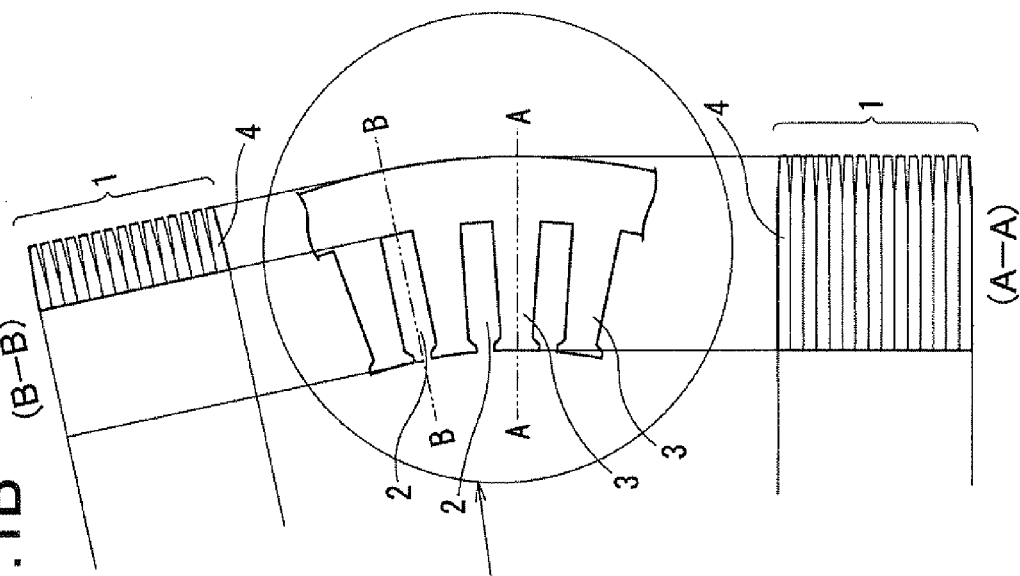
FIG. 1B shows an enlarged principal part of the stator of the rotating electrical machine.

FIG. 1A and FIG. 1B show a helically stacked core 1 as a stator core (hereinafter, simplified to helical core). The helical core 1 is constituted by punching one side in a width direction of a strip of steel sheet in a rectangular shape at a fixed interval to form a core sheet 4 with a plurality of slots 2 and teeth 3 between the slots 2, winding the slotted core sheet 4 spirally so that the core sheet 4 is stacked into a cylindrical or toric shape, and joining between the stacked core sheets 4 by applying welding 5 in an axial direction to a plurality of location of a perimeter in a circumferential direction.

Another side in the width direction of the core sheet 4 (core-back part) is rolled so that a section thereof becomes tapered when the helical core 1 is stacked spirally into the cylindrical (toric) shape.

Thereby, the core sheet 4 has the core-back part whose thickness t1 is thinner in a tapered shape than a thickness t2 of the side where the teeth 3 are formed, and a peripheral length in a perimeter direction of the core-back part is extended to form the cylindrical (toric) shape.

As a result, gaps are produced between the stacked core sheets 4, 4 on the core-back part (an outer circumferential side) of the cylindrical helical core 1.

Moreover, when forming the cylindrical helical core 1 by rolling the core-back part of the core sheet 4, some misalignment in a radius from a central axis occurs in an outer circumference and an inner circumference of the helical core 1 between each layer.

For this reason, a finishing process that reforms the misalignment and corrects the inner and outer circumferential surfaces to predetermined sizes is needed to the helical core 1 as a following process to the above-mentioned winding process and welding process.

Figure 2B:
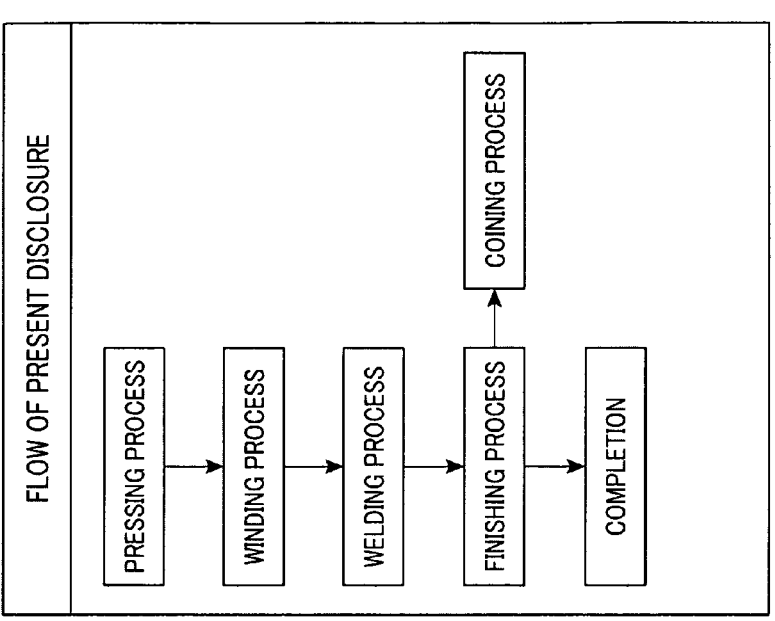
FIG. 2B is a flow chart of a manufacturing process with respect to a flow of the present disclosure.
Figure 2A:
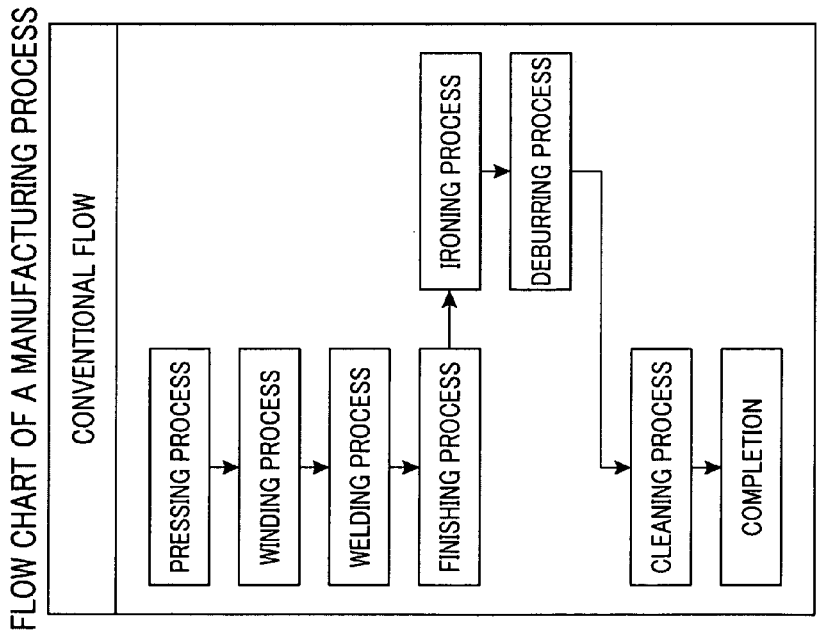
FIG. 2A is a flow chart of a manufacturing process with respect to a conventional flow.

FIG. 2B is a flow chart that shows a manufacturing process of the helical core 1.

A) Pressing process: forms a core sheet that has slots punched out on one side of a strip of steel sheet at a fixed interval to form teeth between the slots, and core-back parts on another side of the steel sheet.

B) Winding process: forms a stacked core by winding spirally and stacking cylindrically the core sheet so that the slots and teeth are positioned in an inner diameter side of the stacked core.

C) Joining (welding) process: joins between each layer of the stacked core by welding etc.

D) Finishing process: corrects inner and outer shapes to predetermined forms while correcting gaps of stacking of the stacked core.

In this disclosure, a coining device 5 shown in FIG. 3A and FIG. 3B performs a coining process as the finishing process.

Moreover, the coining device 5 is consist of a base 51, a columned inner circumferential surface forming part (inner circumferential surface pole) 52, a split die (coining punch) 54, a restraint ring 56, a lifting means (not shown) of the restraint ring 56, and a holding device 58 of a work.

The columned inner circumferential surface forming part 52 is disposed on the base 51. The split die 54 is divided and disposed coaxially in a circle outside the inner circumferential surface forming part 52. The split die 54 has a cone-shaped wedge surface 53 on an upper part of an outer surface. The restraint ring 56 has a conical surface on a lower part of an inner surface disposed coaxially above the split die 54. The holding device 58 is disposed above the base 51.

The helical core 1 is set to the base 51 by inserting it in an annular space formed between the inner circumferential surface forming part 52 and the split die 54.

The helical core 1 is pressed by predetermined pressure in between the base 51 and the holding device 58 by lowering the holding device 58.

The restraint ring 56 is lowered by the lifting means and the conical surface 55 of the restraint ring 56 is pressed to the cone-shaped wedge surface 53 so as to displace the split die 54 in a direction of a center.

Actual processing, however, is that while an end side of the helical core 1 is pressed in an axial direction by the holding device 58, as shown in FIG. 4A and FIG. 4B, the coining punch 54 divided in a circumferential direction and arranged around the helical core 1 is simultaneously moved to a center side in a radial direction, so that the outer surface of the helical core 1 is pressed.

The outer surface of the helical core 1 is pressed and plastic-deformed by the split die (coining punch) 54, while the whole helical core 1 is compressive-deformed in the direction of the center and the coining process is performed.

The coining process deforms the core-back part and all the teeth 3 until inner circumferential side end surfaces of all the teeth 3 of each core sheet contact the inner circumferential surface pole 52 arranged inside the helical core 1.

By the coining process that simultaneously corrects the inner and outer circumferential surfaces of the helical core 1, both the inner and outer diameters of the helical core 1 are reduced, and the inner circumferential end surfaces of all the teeth 3 contact onto the inner circumferential surface pole 52 and corrected as a uniform cylindrical surface.

That is, while the entire helical core 1 becomes coaxial with the inner circumferential surface pole 52 and the coining punch 54 and corrects the gaps between each core sheet of the stacked core, the finishing process that corrects each size of the inner and outer diameter of the stacked core 1 in predetermined sizes is performed.

As shown in FIG. 5A, in a section of the core sheet in the core-back part, the width w material of a perimeter tip part moves to the center side by buckling deformation from the coining process, and the plate thickness increases.

Simultaneously, the sizes of the inner and outer diameters are reduced by compressive deformation.

The end side of the perimeter in the section reduces only to a distance of the width w to a position after processing shown as a solid line from a position before processing shown with a dashed line.

The material of a trapezoid portion d of the width w moves to the center side and flows into a triangle portion e in a thickness direction, and increases the plate thickness after processing from t to T.

Moreover, a radial position r of the end side in the inner circumference side reduces only a distance b to a position after processing shown as a solid line from a position before processing shown with a dashed line by compressive deformation.

FIG. 5B shows a table showing a buckled amount w of the core-back part at a position of the slot 2 in the circumferential direction and at a position of the teeth 3 (reduced amount of the outer diameter), a reduced amount b of the inner diameter (amount moved in a r direction), and features of a deformed plate thickness t after buckling process.

At the teeth position, the amount of buckling w is greater and the moving amount b in the r direction is smaller compared with the slot position.

Since the slot position tends to deform into the center side because a drag by compression is small, it originates in promoting compressive deformation in addition to buckling deformation.

The plate thickness t of the core-back part after buckling deformation is set smaller than the plate thickness T (plate thickness of the teeth part) of each layer.

That is to prevent a defect of rust generated by rain infiltration from the gaps produced between each layers in the inner circumference side in the helical core after coining process if the plate thickness is t>T.

The radius of the inner circumference of the core can be made even for the teeth position and the slot position with the same radius since the inner circumferential surface of the core contacts the outer surface of the inner circumferential surface forming part 52 by coining.

In the stator core manufactured by the above-mentioned manufacturing method, since a coining punch is not displaced in the stacking direction (the axial direction) in the outer circumferential surface of the helically stacked core (helical core) 1, the outer circumferential surface of the stacked sheet is not bent in the stacking direction by frictional force with the coining punch, thus curling deformation can be prevented.

Moreover, since a use of lubricating oil for reducing friction can be abolished, use of excessive materials and consumption of energy for oil washing etc. can be reduced.

Furthermore, since the helical core 1 is coining processed by applying pressure in the axial direction by the holding device, the core sheet can be aligned while preventing floating of each sheet reliably.

As a result, since a thin-walled part of the perimeter of the core sheet buckles and projects expanding in the plate thickness direction, the substantial gaps between the layers decrease.

Thereby, together with the prevention of curling of the perimeter of the core sheet, rain infiltration can be prevented as well as the sizes of inside and outside shapes can be corrected to predetermined sizes.

INDUSTRIAL APPLICABILITY

By performing the finishing process by the coining process, the stator core of the rotating electrical machine of the present disclosure reduces the perimeter gaps between the helical cores, and the inner and outer diameters can be adjusted with less processing, thus excelling in productivity.

What is claimed is:

1. A manufacturing method of a stator core of a rotating electrical machine comprising:
    a pressing process that forms a core sheet that has slots punched out on one side in a width direction of a strip of steel sheet at a fixed interval to form teeth between the slots, and core-back parts on another side of the steel sheet;
    a winding process that forms a helically stacked core by winding spirally and stacking cylindrically the core sheet so that the slots and teeth are positioned in an inner diameter side of the stacked core;
    a joining process that joins between each layer of the helically stacked core; and
    a finishing process that corrects inner and outer shapes to predetermined forms while correcting gaps of stacking of the helically stacked core; wherein,
    the finishing process buckles the core-back part by a coining process that simultaneously moves a coining punch divided in a circumferential direction and arranged around the helically stacked core to a center side in a radial direction and presses an outer surface of each core-back part of the helically stacked core while pressing down an end side of the helically stacked core by a holding device, and
    both the core-back part and the teeth are deformed until an end side of an inner circumferential surface of the teeth becomes coaxial with the coining punch and contacts an inner circumferential surface pole arranged inside the helically stacked core so as to correct inner and outer circumferential surfaces of the helically stacked core.

2. The manufacturing method of the stator core of the rotating electrical machine according to claim 1, wherein,
    an amount of buckling deformation of each core-back part in a radial direction by the coining process is smaller at a slot position compared with a teeth position in a circumferential direction, and
    an amount of movement of each core-back part in the radial directional is larger at the slot position compared with the teeth position in the circumferential direction.

3. The manufacturing method of the stator core of the rotating electrical machine according to claim 1, wherein,
    a plate thickness after the buckling near a perimeter of each core sheet of the helically stacked core after the coining process is thinner than a plate thickness of the core sheet.

* * * * *